(12) United States Patent
Greer et al.

(10) Patent No.: US 8,327,292 B2
(45) Date of Patent: Dec. 4, 2012

(54) DISTINCT GROUPINGS OF RELATED OBJECTS FOR DISPLAY IN A USER INTERFACE

(75) Inventors: Scott B. Greer, Cary, NC (US); Richard B. Southard, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 11/940,877

(22) Filed: Nov. 15, 2007

(65) Prior Publication Data

US 2009/0132958 A1    May 21, 2009

(51) Int. Cl.
G06F 3/048 (2006.01)
(52) U.S. Cl. ...................................... 715/810; 705/7.11
(58) Field of Classification Search .......... 715/733–739, 715/760, 764–767, 810, 841–843, 866; 709/223, 709/224; 705/7.11, 7.15, 7.28, 7.36–7.42
See application file for complete search history.

(56) References Cited

U.S. PATENT DOCUMENTS

| 7,337,440 | B1* | 2/2008 | Schmidt et al. ............... 717/169 |
| 7,774,720 | B1* | 8/2010 | Demetriades et al. ........ 715/853 |
| 2003/0055624 | A1* | 3/2003 | Fletcher et al. .................... 704/2 |
| 2003/0055868 | A1* | 3/2003 | Fletcher et al. ............... 709/201 |
| 2003/0163513 | A1* | 8/2003 | Schaeck et al. ............... 709/201 |
| 2003/0191769 | A1* | 10/2003 | Crisan et al. .................... 707/100 |
| 2004/0249645 | A1* | 12/2004 | Hauser et al. ..................... 705/1 |
| 2006/0031481 | A1* | 2/2006 | Patrick et al. ................. 709/224 |
| 2006/0143229 | A1* | 6/2006 | Bou-Ghannam et al. .. 707/104.1 |
| 2006/0184410 | A1 | 8/2006 | Ramamurthy et al. |
| 2007/0101272 | A1* | 5/2007 | Nomura et al. ............... 715/734 |
| 2007/0168201 | A1 | 7/2007 | Chellam |
| 2007/0208582 | A1* | 9/2007 | Chellam et al. .................. 705/1 |
| 2008/0082987 | A1* | 4/2008 | Mao et al. ...................... 719/313 |
| 2008/0120129 | A1* | 5/2008 | Seubert et al. ..................... 705/1 |
| 2008/0259930 | A1* | 10/2008 | Johnston et al. ........... 370/395.2 |
| 2008/0301135 | A1 | 12/2008 | Alves et al. |
| 2009/0132936 | A1 | 5/2009 | Anderson et al. |

OTHER PUBLICATIONS

De Pauw et al., Web Services Navigator: Visualizing the execution of Web Services, IBM Systems Journal, vol. 44, No. 4, IBM Corporation, 2005.
Wrolstad, Jay, IBM Delivers Self-Healing Software for Tivoli Platform, Sci-Tech Today, pp. 1-5, Dec. 6, 2005, <http://www.sci-tech-today.com/news/IBM-Delivers-Self-Healing-Software/story.xhtml?story_id=012001C8E9WC>, printed Oct. 25, 2007.
Tivoli Composite Application Manager for SOA, IBM Corporation, pp. 1-2, <http://www-306.ibm.com/software/tivoli/products/composite-application-mgr-soa/>., printed Oct. 25, 2007.

(Continued)

Primary Examiner — Tuyetlien Tran
Assistant Examiner — Enrique Iturralde
(74) Attorney, Agent, or Firm — Marcia L. Doubet

(57) ABSTRACT

Related objects are displayed in a user interface. An index value (or other identifier) is associated with each resource in a particular resource group, and this index value enables grouping the resources when a representation of the group is displayed. Spatial consistency may be maintained by displaying the resource groupings in order by their index value, and this order may be maintained over time as the displaying is repeated. The resources in the groupings may correspond to nodes and links in message flows. Preferably, the resources are dynamically determined by observation of their interactions, such as observing the participation of nodes and links in message flows.

13 Claims, 13 Drawing Sheets

OTHER PUBLICATIONS

SOA Management, IBM Tivoli Software, IBM Corporation, pp. 1-2, <http://www-306.ibm.com/software/tivoli/features/soa/index.html>., printed Oct. 25, 2007.

Application Management Buyer's Guide, IBM Corporation, p. 1 of 1, <http://www-306.ibm.com/software/tivoli/resource-center/application-management/bg-app-mgmt.jsp>., printed Oct. 25, 2007.

Composite Applications and the Application Management Life Cycle, IBM Corporation, p. 1 of 1, <http://www-306.com/software/tivoli/resource-center/application-management/ar-composite-applications-meta.jsp>., printed Oct. 25, 2007.

Composite Application Management DeveloperWorks, IBM Corporation, pp. 1-5, <http://www.ibm.com/developerworks/tivoli/application-mgmt>., printed Oct. 25, 2007.

Security and Mangaement for SOA Environments, Service Oriented Architecture Solutions White Paper, IBM Corporation, Aug. 2006, 12 pages.

Event Correlation and Automation, IBM Corporation, Page last updated on Jul. 13, 2006, pp. 1-3 <http://www-306.ibm.com/software/tivoli/solutions/event/>., printed Oct. 25, 2007.

IBM T.J. Watson Research Center, IBM Web Services Navigator, alphaWorks: IBM Web Services Navigator, IBM Corporation, Posted on Dec. 2, 2004, pp. 1-2, <http://alphaworks.ibm.com/tech/wsnavigator>.

Mark A. Anderson, et al., U.S. Appl. No. 11/940,816, filed: Nov. 15, 2007, Office Action, Dec. 23, 2010, 15 pages.

Mark A. Anderson, et al., U.S. Appl. No. 11/940,816, filed: Nov. 15, 2007, Office Action, May 26, 2011, 11 pages.

Mark A. Anderson, et al., U.S. Appl. No. 11/940,816, filed: Nov. 15, 2007, Notice of Allowance, Apr. 6, 2012, 16 pages.

\* cited by examiner

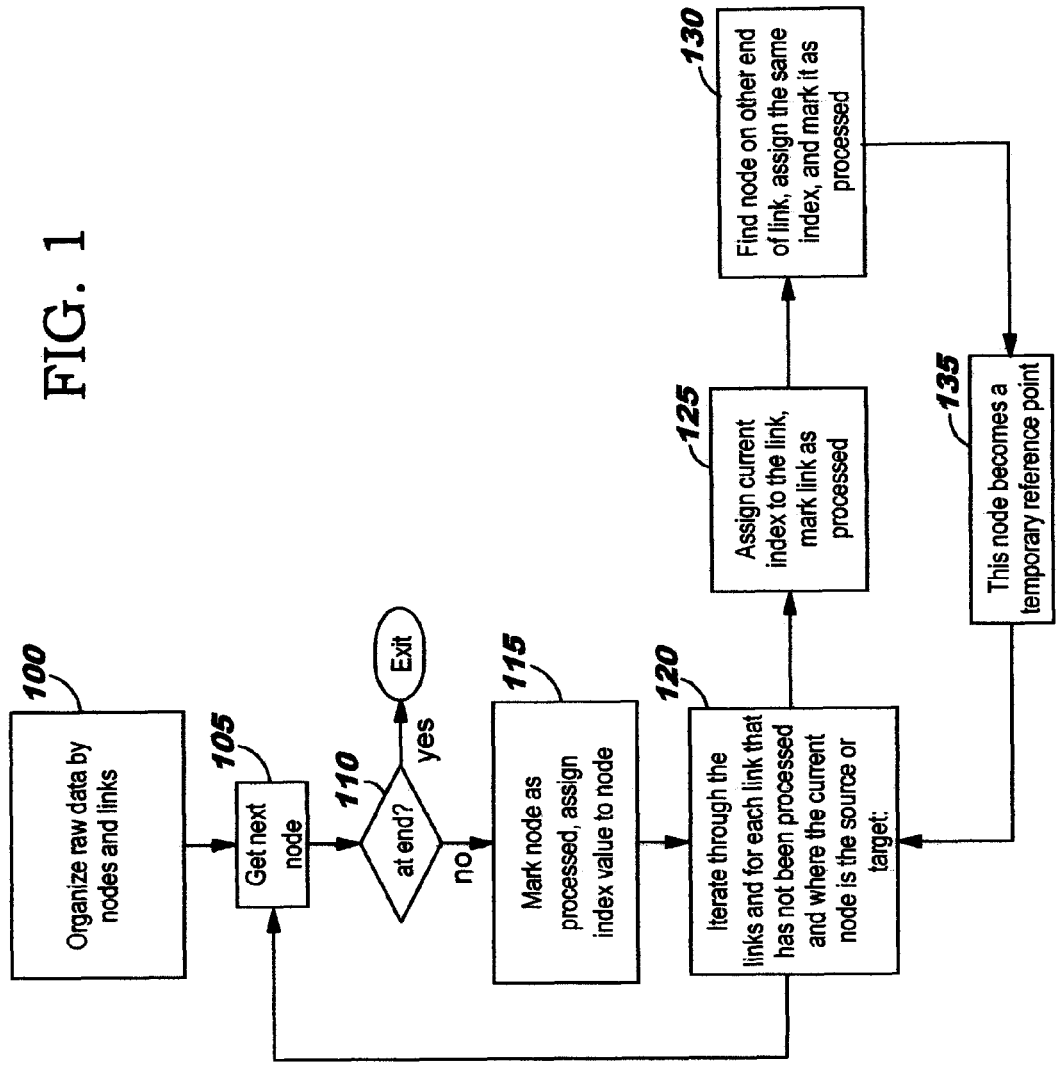

- 201 Operation A on machine 1 gets called from unknown (unmonitored) source
- 202 Operation A on machine 1 calls Operation B on machine 2
- 203 Operation B on machine 2 calls Operation D on machine 2
- 204 Operation D on machine 2 calls Operation E on machine 3
- 211 Operation A on machine 4 gets called from unknown (unmonitored) source
- 212 Operation A on machine 4 calls Operation B on machine 2
- Operation B on machine 2 calls Operation D on machine 2
- Operation D on machine 2 calls Operation E on machine 3
- 221 Operation A on machine 1 gets called from unknown (unmonitored) source
- 222 Operation A on machine 1 calls Operation B on machine 2
- Operation B on machine 2 calls Operation D on machine 2
- Operation D on machine 2 calls Operation E on machine 3
- 231 Operation A on machine 4 gets called from unknown (unmonitored) source
- 232 Operation A on machine 4 calls Operation B on machine 2
- Operation B on machine 2 calls Operation D on machine 2
- Operation D on machine 2 calls Operation E on machine 5
- 241 Operation C on machine 3 is initiated and calls Operation D on machine 2
- Operation D on machine 2 calls Operation E on machine 5
- Operation E on machine 5 calls Operation F on machine 3
- 251 Operation G on machine 4 gets called from unknown (unmonitored) source
- Operation G on machine 4 calls Operation H on machine 2
- Operation H on machine 2 calls Operation I on machine 2
- Operation I on machine 2 calls Operation J on machine 5
- 261 Operation A on machine 4 gets called from unknown (unmonitored) source
- Operation A on machine 4 calls Operation H on machine 2
- Operation H on machine 2 calls Operation I on machine 2
- Operation I on machine 2 calls Operation J on machine 5

301
- Operation A was observed on machine 1
- Operation A was observed on machine 4
- Operation B was observed on machine 2
- Operation C was observed on machine 3
- Operation D was observed on machine 2
- Operation E was observed on machine 3
- Operation E was observed on machine 5
- Operation F was observed on machine 3
- Operation G was observed on machine 4
- Operation H was observed on machine 2
- Operation I was observed on machine 2
- Operation J was observed on machine 5

331
- Operation A on machine 1 was called from an unknown source
- Operation A on machine 4 was called from an unknown source
- A message went from Operation A on machine 1 to Operation B on machine 2
- A message went from Operation A on machine 4 to Operation B on machine 2
- A message went from Operation A on machine 1 to Operation B on machine 2
- ...

```
<?xml version="1.0" encoding="UTF-8"?>
<graph
    xmlns="http://www.ibm.com/management/soa/exampleNameSpace"
    xmlns:ss="http://www.ibm.com/management/soa/soaDiscoveryGraph"
    xmlns:xsi="http://www.w3.org/2001/XMLSchema-instance"
    xsi:schemaLocation="http://www.ibm.com/management/soa/exampleNameSpaceexampleNameSpace.xsd">
410     <node guid="aa0f5d73-11f4-36d4-9054-6f14fc4a2f8f"
            nodeType="OpAgg">        411
            <label>order</label>
            <ss:OpAgg degraded="0" index="0"
                instances="1" situations="0" status="0" />
        </node>
420     <node guid="af6be1df-8285-354a-a928-48cd05aeedff"
            nodeType="OpAgg">
            <label>customerOrder</label>
            <ss:OpAgg degraded="0" index="0"
                instances="1" situations="0" status="0" />
        </node>
430     <node guid="80f25dfd-ed56-339c-93ae-6640fdd20e3e"
            nodeType="OpAgg">
            <label>shipOrder</label>
            <ss:OpAgg degraded="0" index="0"
                instances="1" situations="0" status="0" />
        </node>
440     <node guid="16a4ed9e-f75e-3b47-9115-c0d3cc183c11"
            nodeType="OpAgg">
            <label>processPayment</label>
            <ss:OpAgg degraded="0" index="0"
                instances="1" situations="0" status="0" />
        </node>
```

FIG. 4 (cont'd)

```
450    <link
         guid="aa0f5d73-11f4-36d4-9054-6f14fc4a2f8f80f25dfd-ed56-339c-93ae-6640fdd20e3e"
         linkType="callPath">
         <source>aa0f5d73-11f4-36d4-9054-6f14fc4a2f8f</source>
         <target>80f25dfd-ed56-339c-93ae-6640fdd20e3e</target>
         <ss:callPath index="0" />        451
       </link>
460    <link
         guid="aa0f5d73-11f4-36d4-9054-6f14fc4a2f8f16a4ed9e-f75e-3b47-9115-c0d3cc183c11"
         linkType="callPath">
         <source>aa0f5d73-11f4-36d4-9054-6f14fc4a2f8f</source>
         <target>16a4ed9e-f75e-3b47-9115-c0d3cc183c11</target>
         <ss:callPath index="0" />
       </link>
470    <link
         guid="af6be1df-8285-354a-a928-48cd05aeedffaa0f5d73-11f4-36d4-9054-6f14fc4a2f8f"
         linkType="callPath">
         <source>af6be1df-8285-354a-a928-48cd05aeedff</source>
         <target>aa0f5d73-11f4-36d4-9054-6f14fc4a2f8f</target>
         <ss:callPath index="0" />
       </link>
</graph>
```

FIG. 9

Iterate through all of the nodes, and for each node:
    If the index value is already set, then skip this node
    Otherwise
        Set the index value for this node
        Iterate through the links to find all links having this node as the source
            For each such link, repeat this process for the target node
        Iterate through the links to find all links having this node as the target
            For each such link, repeat this process for the source node

DISTINCT GROUPINGS OF RELATED OBJECTS FOR DISPLAY IN A USER INTERFACE

CROSS-REFERENCE TO RELATED APPLICATION

The present application is related to commonly-assigned U.S. patent application Ser. No. 11/940,816, titled "Message Flow Interactions for Display in a User Interface" and filed concurrently herewith, which is hereby incorporated herein as if set forth fully (and which is referred to herein as "the related application").

BACKGROUND OF THE INVENTION

The present invention relates to computers, and deals more particularly with identifying distinct groupings of related objects (such as nodes and links in a message flow) for display on a user interface.

In user interfaces where information is presented that is provided by a series of nodes and links, the overall relationship of the resources being shown is not always known. In many cases, the information in the underlying data source(s) is disjoint. For example, in a system where a number of message flows (or equivalently, message call paths) exist, a situation might arise where Process A calls Process P which calls Process X and Process Z. Additionally, another flow within the system might comprise Process D calling Process E which in turn calls Process F. In known systems, these relationships may be stored as discrete pieces of information. For example, a record in a first database might record that Process A calls Process P, and a record in a second database might record that Process P calls Process X and perhaps still another database contains the record that Process P calls Process Z.

Known systems may (for example) provide this pair-wise relationship information to the user interface as the discrete pieces of information. However, layout or display of the data, especially in a topological view, is typically done based on how the data will fit the display area best, such as according to path length or other considerations, rather than actual relationships. This does not provide a logical context for the display, and can make interpretation of the data difficult for the user.

BRIEF SUMMARY OF THE INVENTION

The present invention is directed to displaying related objects on a user interface. In one embodiment, this comprises: for each of a plurality of related object groupings, associating an identical value with each object of that related object grouping; and displaying, on the user interface, each of the related object groupings in an order according to the associated value that is associated with each of the objects in that related object grouping. In one aspect, the display of each of the related object groupings further comprises a representation of each of the objects in that related object grouping and each of the objects in that related object grouping are grouped therein using the associated value, the order is a sequential order, and the order among the related object groupings is maintained over time as the displaying is repeated for at least two of the plurality of related object groupings (which may be facilitated by sorting or otherwise organizing the objects prior to the associating).

In this or a different aspect, the objects may comprise nodes and links that participate in message flow interactions. In this aspect, each of the related object groupings may comprise a particular one of the message flow interactions, and the display may provide, for each of the related object groupings, a view of the nodes and the links that participate in that particular one of the message flow interactions. The nodes and links may be determined dynamically by observing the participation in the message flow interactions.

Embodiments of these and other aspects of the present invention may also, or alternatively, be provided as systems or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 provides a flowchart depicting logic that may be used when implementing an embodiment of the present invention;

FIG. 2 illustrates a sample set of data pertaining to example nodes and links, and FIGS. 3A-3C provide alternative representations of this data for illustrating operation of an embodiment of the present invention;

FIG. 4 provides a sample markup language document that illustrates one approach to recording information about nodes and links, according to an embodiment of the present invention.

FIG. 9 specifies an algorithmic approach that may be used for representing the processing of nodes and links;

DETAILED DESCRIPTION OF THE INVENTION

Figures 3C, 5:
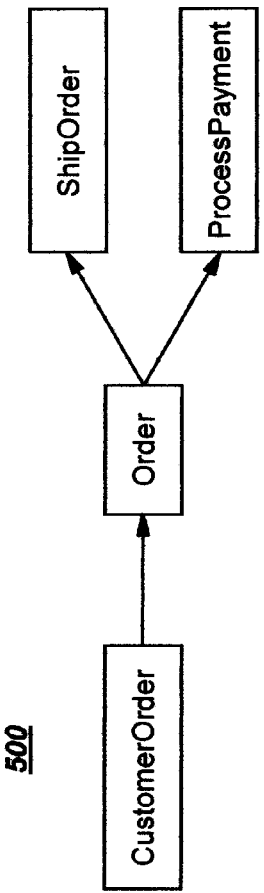
FIG. 5 illustrates relationships for the nodes and links according to this sample document.

Several problems that may occur when trying to display relationships between processes or other resources participating in message interactions were discussed above. Known systems do not maintain spatial relationships among displayed data from one display iteration to the next, and therefore lack a consistent logical context for the display. Without some sort of grouping information, the discrete pieces of information may be difficult for the user to interpret and the user may be unable to get an overall system view.

A common approach to this kind of issue is to use some kind of up-front modeling to define or configure what sets of resources are associated with each other. This approach can be labor-intensive to define and maintain, especially if the set of resources is large or subject to frequent changes. Additionally, the tedious nature of this up-front modeling approach causes it to be error-prone, and a system model may be relatively inflexible to quick change.

As another approach, the information may be presented in a series of message flow arrangements. The approach described in the related invention, for example, depicts message flow interactions and does not require up-front modeling.

An embodiment of the present invention dynamically determines relationships among objects (such as communicating entities) and uses those relationships to group the objects (referred to equivalently herein as resources) for display. The display might comprise, by way of example, a list in a textual interface or a layout in a topological interface. Instead of using modeling, an embodiment of the present invention preferably uses as-observed information that is collected from message interactions between resources.

Using techniques disclosed herein, an index is assigned to each set of related resources. This index is then usable for grouping the related resources for presentation to a user, and an order may be imposed on the display of the resource information. A more logical and consistent layout, which may be more understandable to the user than viewing disjoint pieces of information as has been discussed, may therefore be achieved when using an embodiment of the present invention.

Referring now to FIG. 1, a flowchart is provided depicting logic that may be used when implementing an embodiment of the present invention. As shown therein, raw data is organized (Block 100). This raw data may be observed by an agent or monitoring process, or other message interception point, in code executing at an application server (or a plurality of application servers), and comprises information pertaining to resources participating in a message network (and the manner in which these agent or monitoring processes operate to gather such information does not form part of the inventive concepts disclosed herein). In a preferred embodiment, the organizing carried out at Block 100 comprises sorting or otherwise grouping the raw data into a list of nodes and a separate list of links that represent message interactions between nodes. (Data structures other than lists may be used without deviating from the scope of the present invention, and reference herein to lists is therefore by way of illustration but not of limitation.) Sample data used to illustrate processing in FIG. 1 is provided in FIGS. 2-8, as will now be described.

FIG. 2 provides a sample set of raw data 200 comprising a number of discrete pieces of information. This raw data might correspond, by way of illustration but not of limitation, to service operation invocations observed in a system based on a service-oriented architecture. The term "service-oriented architecture", or "SOA", is used to refer to a distributed computing model whose smallest unit of work is a service operation (where the term "service operation" refers to executable code that performs at least a portion of a service). While embodiments of the present invention may be discussed herein with reference to an SOA environment, it should be noted that this is by way of illustration only.

A particular SOA solution (i.e., a deployed SOA implementation) may comprise dozens or even hundreds of service operations, and many occurrences of each service operation may exist as the operations are distributed, often redundantly, throughout an enterprise. As a result, an SOA solution may be potentially large and complex, and thus difficult to manage. The potentially numerous service operations in an SOA solution may interact with each other in complex ways. Because an SOA solution is often deployed in an ad hoc manner, even basic tasks such as visualizing or navigating the call relationships among services may be impossible when using known techniques. By contrast, grouping related objects for display as disclosed herein enables providing a more logical layout whereby the user can visualize relationships among resources in the SOA solution.

In its original form, raw data 200 may be distributed among various storage repositories (including one or more databases). Within such storage repositories, the data may be stored as even smaller discrete pieces of information. For example, rather than the information shown at 202, 222, a discrete piece of information might be stored such as "Operation A was observed executing on machine 1", and this might be combined with another discrete piece of information indicating "a message went from Operation A on machine 1 to Operation B on machine 2" to yield entries 202, 222. Accordingly, the raw data collection 200 may represent a concatenation of discrete pieces of information and is provided by way of illustration and not of limitation. Furthermore, additional information (such as execution metrics or information about the application programs or service operations which generated the messages) may be stored in association with these discrete pieces of information without deviating from the scope of the present invention. A message number or other identifier may be associated with the discrete pieces of information to enable tracing the flow of a message through various nodes and across various links (and such message identifier may optionally be included in the lists created at Block 100), although this has not been illustrated in FIG. 2.

The sample raw data 200 in FIG. 2 pertains to 10 different operations having sample names "Operation A" through "Operation J". The "calls" syntax illustrated in raw data 200 may be parsed to determine the links between various ones of these 10 service operations. The "gets called from" syntax in raw data 200 (see reference numbers 201, 211, for example) and the "is initiated" syntax (see reference number 241) represent, for this example syntax, the starting point of a call path. (It may happen that some application servers are not monitored by agent processes. In such cases, the "gets called from" indication represents the known starting point of the call path, although this may actually correspond to an intermediate service operation invocation within a call path.)

With reference to this sample raw data 200, Block 100 of FIG. 1 creates a list of 10 nodes, each of which represents one of these operations, as well as a list of the links between each of these nodes. FIG. 3A illustrates a textual representation 300 of the list of nodes, and FIG. 3B illustrates a textual representation 330 of the portion of the list of links. For example, the entry at reference number 301 of FIG. 3A corresponds generally to the entries at reference numbers 201, 202, 221, 222 of FIG. 2, and the entry at reference number 331 of FIG. 3B corresponds generally to the entries at reference numbers 201, 221 of FIG. 2. FIG. 3C provides another sample representation 360 that represents the interactions from raw data 200. In this sample representation (which is provided for discussion purposes, and does not necessarily correspond to an actual representation to be created by Block 100), the syntax "A1" comprises an abbreviation of "Operation A on machine 1", and so forth. Accordingly, the first row 361 of FIG. 3C represents the raw data at reference numbers 201-204 of FIG. 2. It can be seen from the sample representation in row 361 that an outbound link exists from "A1" to "B2", where this link is shown at reference number 362. The list of links created from sample raw data 200, which may take a form as illustrated by the entries in 330 of FIG. 3B, will therefore include a link which indicates that its source node is "A1" and its target node is "B2".

On the other hand, it may happen that an identification of the application server on which an operation is executing is not significant for purposes of displaying message flow interactions. The information shown in row 361 of FIG. 3C might therefore be represented as "A" invoking "B", which invokes "D", which in turn invokes "E" and such an approach is also within the scope of the present invention.

In one embodiment, the node list and link list created at Block 100 of FIG. 1 may comprise elements in a markup language document, such as an Extensible Markup Language or "XML" document. FIG. 4 illustrates a sample XML document 400. In this approach, a <node> element as illustrated by reference number 410 in FIG. 4 may be created for each of the 10 operations found in raw data 200, and a <link> element as illustrated at reference number 451 in FIG. 4 may be created for each of the links. (Sample XML document 400 provides <node> elements and <link> elements representing the simple call graph shown at 500 of FIG. 5, and does not illustrate the operations or call relationships of sample data 200.) By way of illustration but not of limitation, FIG. 4 illustrates use of a globally-unique identifier ("GUID") for distinguishing among each of the nodes, and an identifier for each of the links is constructed by concatenating the GUIDs of the source and target nodes of that link.

Figure 6:
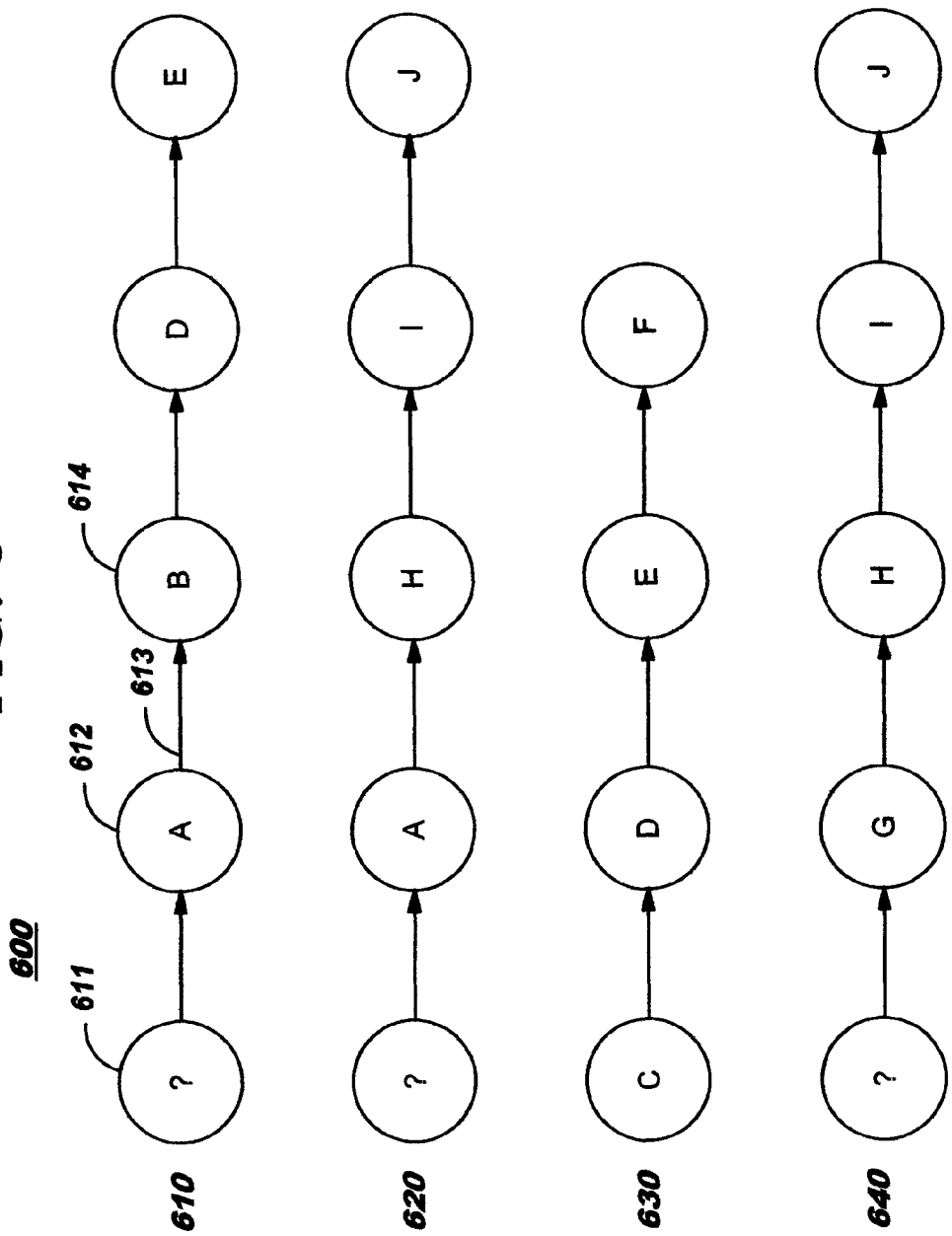
FIGS. 6-8 provide representations of the sample data from FIG. 2.

Referring now to FIG. 6, this figure graphically illustrates the nodes and relationships between those nodes, as represented by raw data 200 of FIG. 2. As can be seen therein, the relationships indicate that, without regard to the hosting application servers, 4 distinct calling paths 600, 610, 620, 630 have been observed. In this diagram 600, the "?" in the first node in 3 of the 4 paths indicates that the caller of the first identified operation is not known. For example, the "?" in node 611 of path 610 indicates that the caller of Operation A (represented in node 612) is not known.

According to an embodiment of the related invention, the node A at reference number 612 represents an aggregation of instances of Operation A. In the sample raw data 200, Operation A calls Operation B in 4 of the observed call paths. See reference numbers 202, 212, 222, 232. Of these 4 invocations, Operation A is executing on machine 1 for 2 of those invocations (see reference numbers 202, 222) and on machine 4 for the remaining 2 invocations (see reference numbers 212, 232). By aggregating these 4 calls into a single call path 613 between node A 612 and node B 614, as disclosed in the related invention, a visual depiction of the operation of the SOA solution corresponding to raw data 200 can be simplified.

By contrast to using the aggregation of service operations represented in diagram 600, if a separate calling path was created each time the hosting application server was distinct, then 6 different calling paths would result from the 7 sets of information 201, 211, 221, 231, 241, 251, 261 found in raw data 200 (where the information at 201 and 221 uses the same call relationships among service operations hosted on the same application servers). These 6 different calling paths are illustrated in the representation 360 of FIG. 3C.

Figure 7:
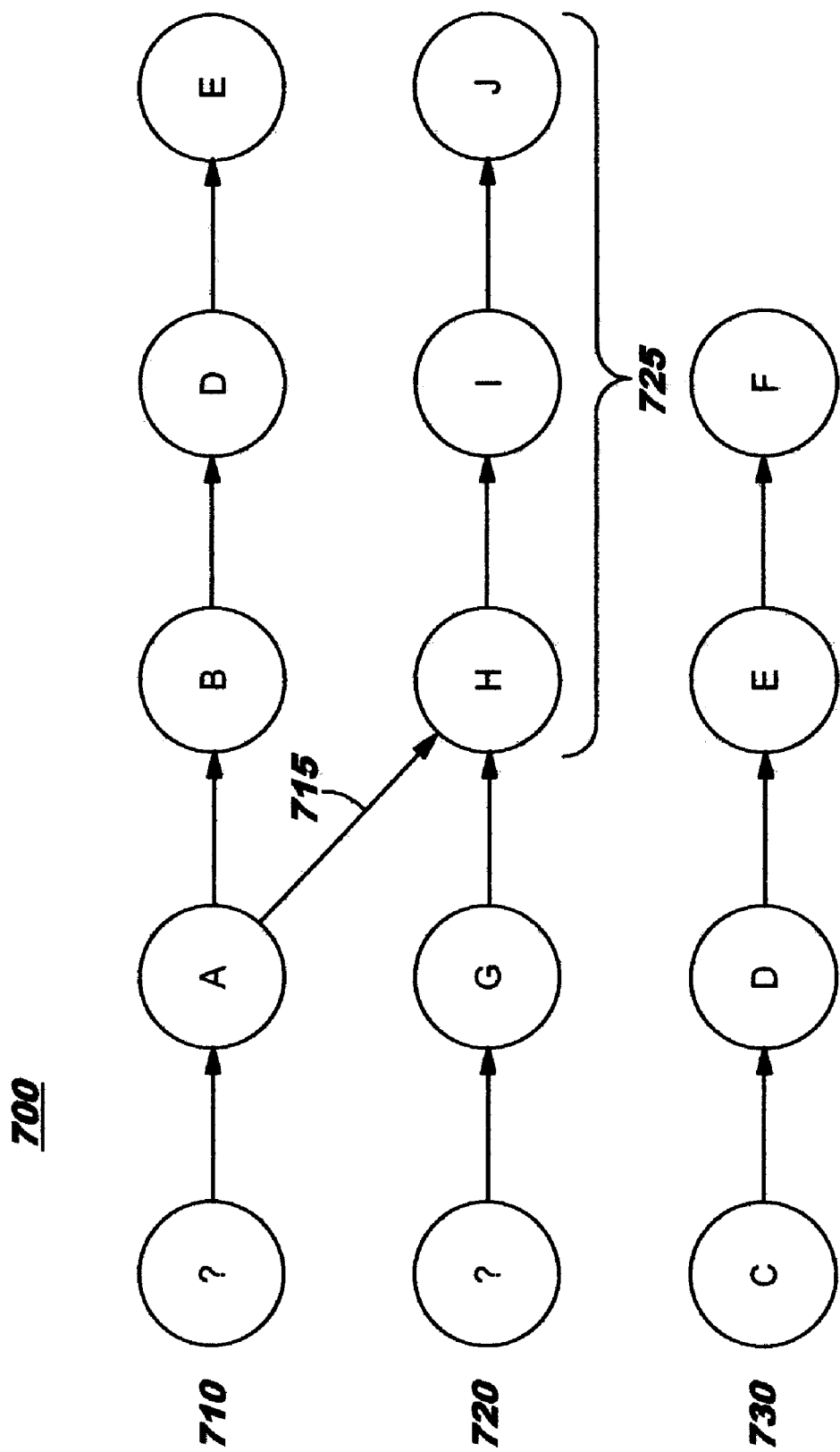
Figure 8:
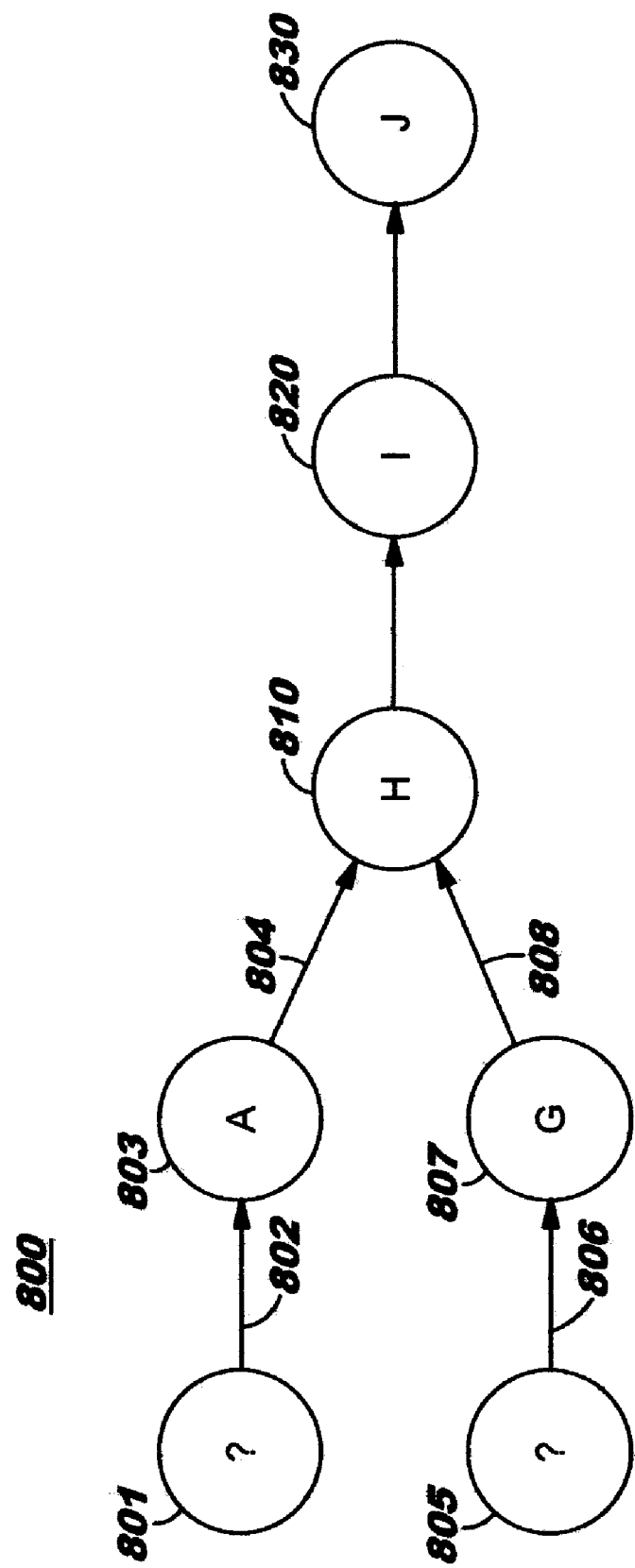

FIG. 7 shows an alternative diagram 700 that may be created from raw data 200 by organizing the data according to flows instead of operations. The call relationships in the raw data may form a mesh network, where at least some part of a calling path is shared by other calling paths. In this example, calling path 630 from the operation aggregation represented in FIG. 6 is unchanged, when organized by flows, into flow 730. Callings paths 610 and 640 from FIG. 6 correspond to flows 710 and 720 of FIG. 7, respectively. Arrow 715 in FIG. 7 indicates that an interaction is detected whereby the subgraph 725 occurs in calling path 620 as well as in calling path 640. Accordingly, diagram 700 presents a compacted view of the relationships among the nodes, and the service operations which they represent, as compared to diagram 600.

An embodiment of the present invention may facilitate drill-down processing that enables a user to perform further investigation, if desired. This is represented pictorially by diagram 800 in FIG. 8, where the user in this example may have chosen to view more information pertaining to operation H. Diagram 800 thus enables the user to see a representation of upstream and downstream resources that could impact, or be impacted by, the processing of the service operation instances aggregated at node H 810. For example, if service degradation is detected at node H, the user can drill down to diagram 800 and see that this may be a result of poor performance of some unknown invoking operation 801, 805; a known invoking operation A 803 or G 807; or perhaps congestion on communication links 802, 804, 806, or 808 between service invocations. Similarly, diagram 800 enables the user to see that a service degradation at node H 810 may cause subsequent degradation (such as missed turnaround-time commitments) at service operations corresponding to node I 820 and/or node J 830. The user may choose to navigate among the potentially numerous instances of service operation H, if desired. (The actual impact of service degradation, or cause thereof, is not material to an embodiment of the present invention.)

Alternatively, a diagram such as diagram 800 may be presented to a user for other reasons, without deviating from the scope of the present invention.

Returning now to the discussion of FIG. 1, an embodiment of the present invention analyzes the now-organized raw data from operation of Block 100 and assigns a set of indexes, using a unique one of those indexes for each object in a particular object group that participates in the overall message network. (A key or other identifier may be used instead of an index, without deviating from the inventive techniques disclosed herein.) Each of the nodes from the list created at Block 100 (or more generally, each of the nodes from the source data) is processed iteratively. Block 105 therefore indicates that the next node from the input is obtained. Block 110 tests whether the nodes are now at the end (i.e., whether all of the nodes have been processed). If this test has a positive result, then processing exits from FIG. 1. Otherwise, processing continues at Block 115.

An embodiment of the present invention preferably "marks" each node and link as it is processed, which may comprise associating a bit or other indicator with a representation of the node or link, adding an identifier of each processed node or link to a list or other data structure that records which ones have been processed, etc. This marking may alternatively comprise assigning the index value to the node or link, whereby any node or link with an associated index is considered as already processed, in which case a separate indicator to signify the marking is not required. (Accordingly, references herein to marking a node or link and associating an index therewith should be interpreted as including this case where the associating implies the marking.)

In Block 115, the current node is marked and a unique index value is associated with the node. In one embodiment, the index values comprise sequentially-assigned numbers. The index value (referred to equivalently herein as an index) may be an attribute of the node, and may optionally be persisted with a representation of the node. (The <node> and <link> elements in XML document 400 of FIG. 4 may include "index" attributes usable for this persisting, for example. See reference numbers 411 and 451, where this is illustrated. Various other child elements and/or attributes may be recorded for <node> and <link> elements, in addition to or instead of the examples shown in FIG. 4, without deviating from the scope of the present invention.) The same index associated with a node is associated with each of the links where this node is an endpoint (i.e., either a source or a target of the link). Accordingly, Blocks 120-135 process each link associated with the current node, as will now be described.

Block 120 indicates that an iterative process is performed on the links in the list created at Block 100. For each link in the list, this iterative processing comprises executing Blocks 125-135, provided that the link has not already been marked as processed and the link has the current node as either its source or its target. (If any of these conditions are not met, then Block 120 gets a different one of the links from the list.) In Block 125, the current index value is associated with this link, and the link is marked as processed. Block 130 then finds the node on the other end of the link (i.e., in the list created at Block 100). If the node has not already been marked, then it is assigned the current index value and marked. As indicated by Block 135, this node now becomes a temporary reference point, and control returns to Block 120 to recursively process the links associated with this "temporary reference point" node.

By recursively processing link endpoints in both directions from each node found, all nodes that are part of the same relationship group will be assigned the same index. Once a node or link has been assigned an index, it will no longer be processed so it is assured that infinite recursion will not occur.

When all of the links associated with the node obtained at Block 105 have been processed according to Blocks 120-135, control returns from Block 120 to Block 105 to obtain the next node (if any). This next node is then processed, or if there were no more nodes, then control exits from FIG. 1.

The processing of nodes and links, as has been discussed with reference to FIG. 1, may alternatively be represented using the algorithmic approach specified in FIG. 9.

To view a relationship group, all identically-indexed objects are determined for rendering on a user interface. When an embodiment of the present invention is used with message flows in an SOA solution, the objects pertain to nodes and links, and a particular relationship group represents a particular message flow in the SOA solution.

Figure 10:
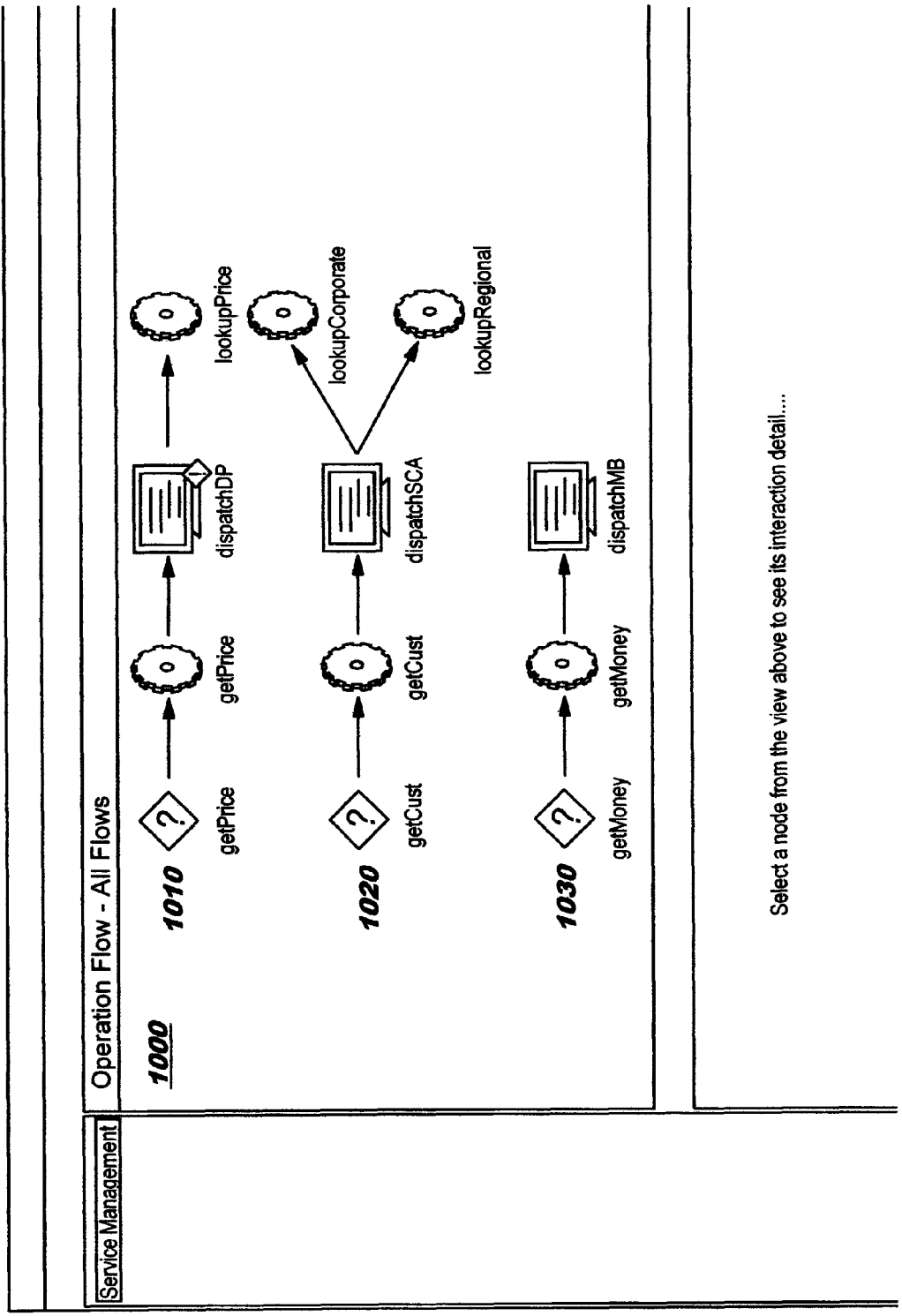
FIG. 10 provides a sample view to illustrate rendering of message flows according to an embodiment of the present invention.

An embodiment of the present invention preferably renders each message flow in order according to its associated index value. A view such as view 1000 of FIG. 10 may be presented, where in this example, 3 flows 1010, 1020, 1030 are rendered. By using the index values to present the flows in order, spatial consistency is maintained. Particularly in a complex environment where dozens or hundreds of flows may occur, this spatial consistency may be advantageous for the user who interacts with view 1000 repeatedly over time: because the raw data is sorted or grouped and index values are then assigned to this sorted data, as disclosed herein, each successive iteration of the processing of FIG. 1 presents message flows to the user in the same relative order. For example, the user's understanding may be improved by always seeing message flow 1010 appear prior to message flow 1020 if both of those flows are occurring in the underlying raw data; or, if flow 1010 appears in the raw data at some point in time but flow 1020 does not, it might be instructive to the user to see message flow 1010 followed immediately by flow 1030. Furthermore, if the user moves from a first view to a second view and then back to the first view, an embodiment of the present invention enables viewing the message flows of the first view in the same order upon the return. This may make it easier for the user to maintain context of the overall system and/or make it easier for the user to see changes in the structure and/or status of the system or portions thereof.

The approach of using observed data, according to an embodiment of the present invention, relieves the user or system administrator of having to create complex system models or other interactions (such as creating definitions of configurations within an SOA solution). In addition to avoiding the tedium and maintenance issues associated with a model-based or configuration-based approach, an embodiment of the present automatically adapts to a changing or evolving environment where the participating resources may change over time.

The in-context, as-observed presentation enabled by an embodiment of the present invention may be used with an embodiment of the related invention to render information for system administrators or other users as they perform triage, impact analysis, and/or causal analysis in support of operational SOA solutions. Various high-level views of this information may be shown to a user and drill-down operations may be supported for obtaining further details, as described in the related invention.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. In a hardware embodiment, specialized or dedicated circuitry may be provided that carries out functions described herein. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 11:
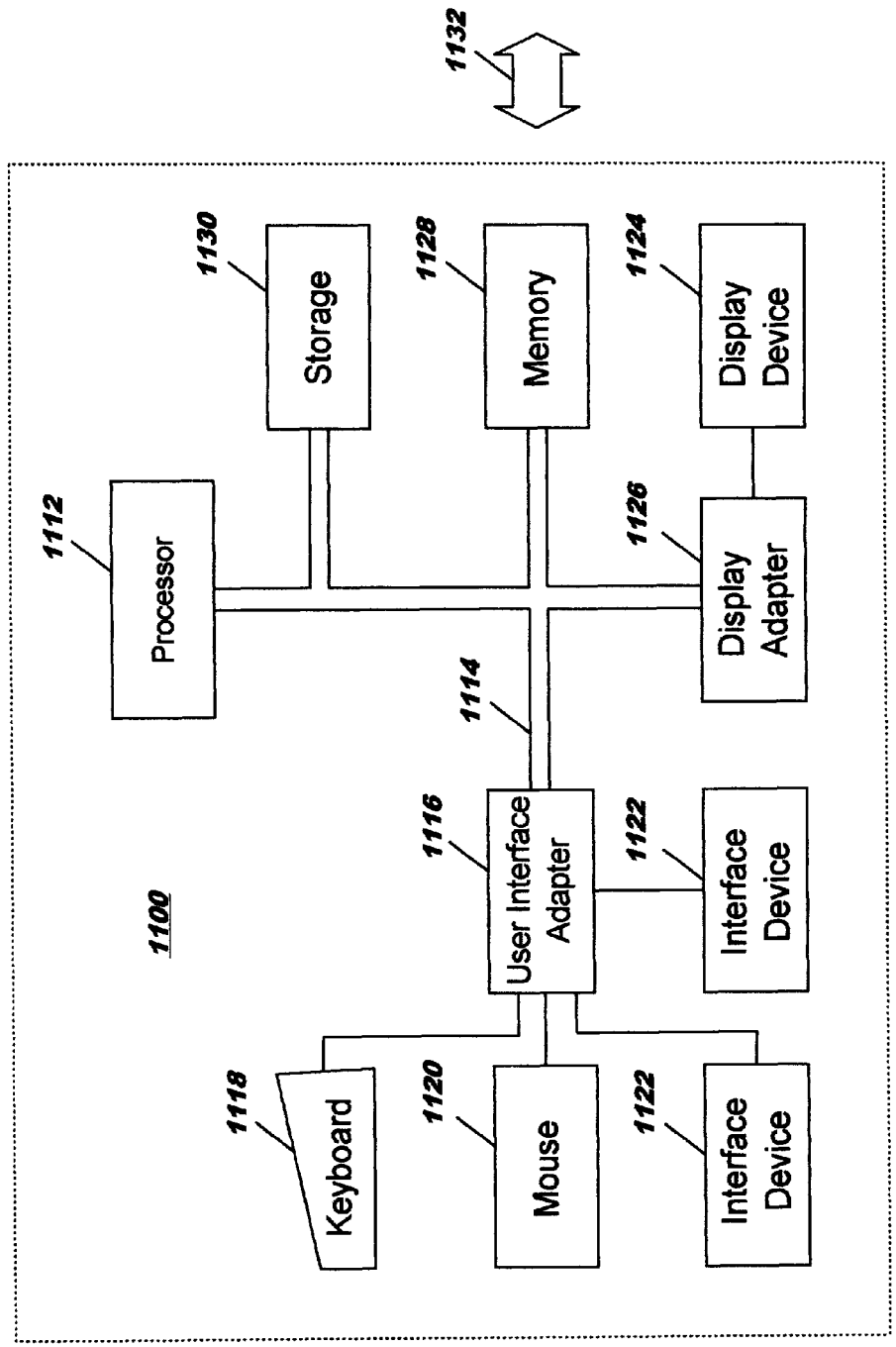
FIG. 11 depicts a data processing system suitable for storing and/or executing program code.

Referring now to FIG. 11, a data processing system 1100 suitable for storing and/or executing program code includes at least one processor 1112 coupled directly or indirectly to memory elements through a system bus 1114. The memory elements can include local memory 1128 employed during actual execution of the program code, bulk storage 1130, and cache memories (not shown) which provide temporary storage of at least some program code in order to reduce the number of times code must be retrieved from bulk storage during execution.

Input/output ("I/O") devices (including but not limited to keyboards 1118, displays 1124, pointing devices 1120, other interface devices 1122, etc.) can be coupled to the system either directly or through intervening I/O controllers or adapters (1116, 1126).

Network adapters may also be coupled to the system to enable the data processing system to become coupled to other data processing systems or remote printers or storage devices through intervening private or public networks (as shown generally at 1132). Modems, cable modem attachments, wireless adapters, and Ethernet cards are just a few of the currently-available types of network adapters.

Figure 12:
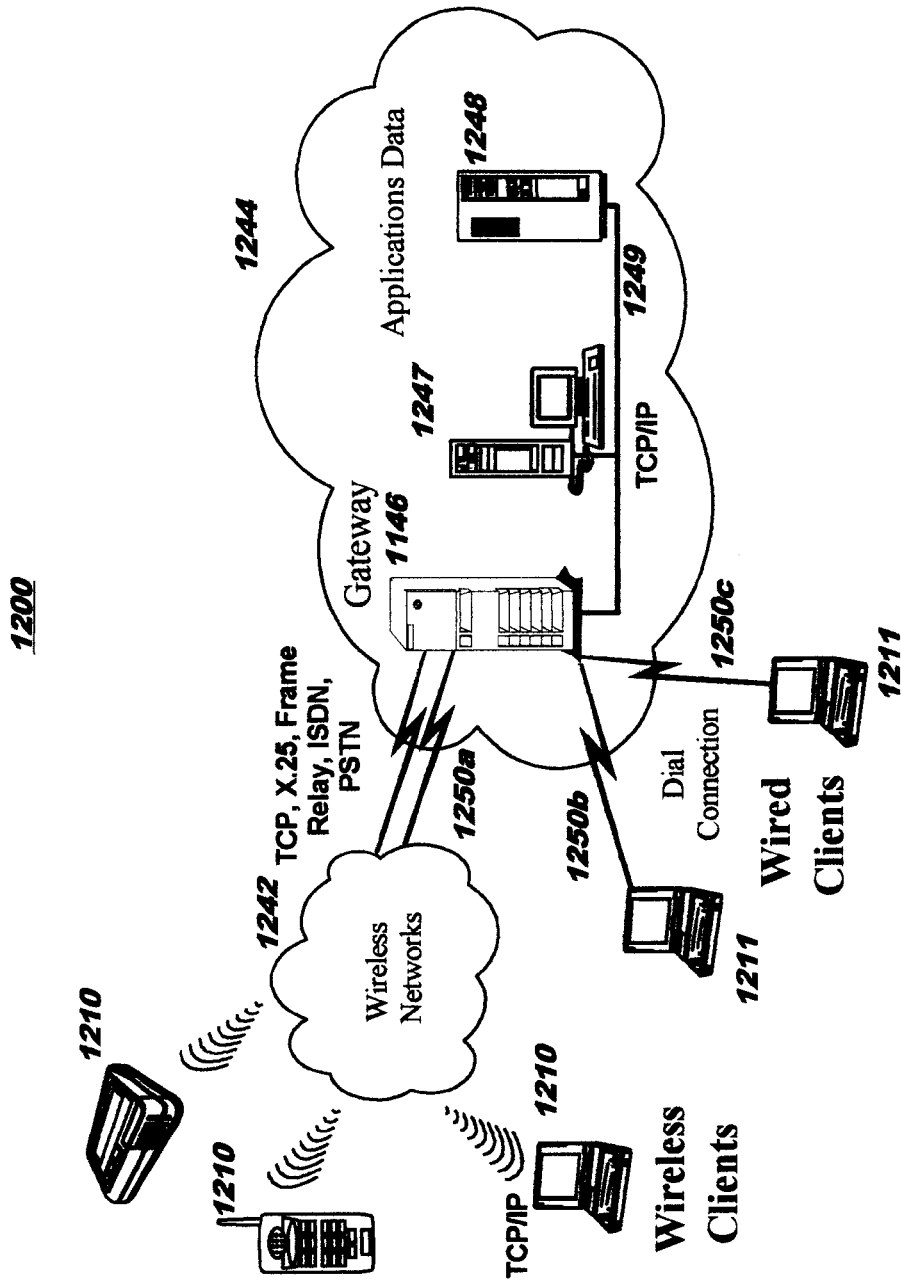
FIG. 12 depicts a representative networking environment in which one or more embodiments of the present invention may be used.

FIG. 12 illustrates a data processing network environment 1200 in which the present invention may be practiced. The data processing network 1200 may include a plurality of individual networks, such as wireless network 1242 and network 1244. A plurality of wireless devices 1210 may communicate over wireless network 1242, and a plurality of wired devices, shown in the figure (by way of illustration) as workstations 1211, may communicate over network 1244. Additionally, as those skilled in the art will appreciate, one or more local area networks ("LANs") may be included (not shown), where a LAN may comprise a plurality of devices coupled to a host processor.

Still referring to FIG. 12, the networks 1242 and 1244 may also include mainframe computers or servers, such as a gateway computer 1246 or application server 1247 (which may access a data repository 1248). A gateway computer 1246 serves as a point of entry into each network, such as network 1244. The gateway 1246 may be preferably coupled to another network 1242 by means of a communications link 1250a. The gateway 1246 may also be directly coupled to one or more workstations 1211 using a communications link 1250b, 1250c, and/or may be indirectly coupled to such devices. The gateway computer 1246 may be implemented utilizing an Enterprise Systems Architecture/390® computer available from IBM. Depending on the application, a midrange computer, such as an Application System/4000 (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1246 may also be coupled 1249 to a storage device (such as data repository 1248).

Those skilled in the art will appreciate that the gateway computer 1246 may be located a great geographic distance from the network 1242, and similarly, the wireless devices 1210 and/or workstations 1211 may be located some distance from the networks 1242 and 1244, respectively. For example, the network 1242 may be located in California, while the gateway 1246 may be located in Texas, and one or more of the workstations 1211 may be located in Florida. The wireless devices 1210 may connect to the wireless network 1242 using a networking protocol such as the Transmission Control Protocol/Internet Protocol ("TCP/IP") over a number of alternative connection media, such as cellular phone, radio frequency networks, satellite networks, etc. The wireless network 1242 preferably connects to the gateway 1246 using a network connection 1250a such as TCP or User Datagram Protocol ("UDP") over IP, X.25, Frame Relay, Integrated Services Digital Network ("ISDN"), Public Switched Telephone Network ("PSTN"), etc. The workstations 1211 may connect directly to the gateway 1246 using dial connections 1250b or 1250c. Further, the wireless network 1242 and network 1244 may connect to one or more other networks (not shown), in an analogous manner to that depicted in FIG. 12.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention. Furthermore, while the discussion herein may refer to "an embodiment" or "one embodiment" of the present invention, such references are not necessarily discussing the same embodiment.

The invention claimed is:

1. A computer-implemented method for displaying related objects on a user interface, comprising:
    processing a plurality of objects observed to have participated in at least one message flow, the objects comprising nodes and links, to determine each of a plurality of related object groupings, comprising:
        selecting an unprocessed one of the nodes for processing;
        assigning a unique index value to the selected node;
        iterating through the links to locate each link where the selected node is either a calling node or a called node in a message flow;
        assigning the unique index value to each of the located links;
        for each of the located links, finding a corresponding called node for the link when the selected node is the calling node for the link or finding a corresponding calling node for the link when the selected node is the called node for the link;
        assigning the unique index value to each of the found corresponding called nodes and to each of the found corresponding calling nodes; and recursively processing, as the selected unprocessed one of the nodes for processing, each of the found corresponding called nodes and each of the found corresponding calling nodes;

for each of the determined related object groupings, persisting a definition of the related object grouping to persistent storage, the definition identifying each of the nodes and each of the links in the grouping, and for each of the nodes and each of the links in the grouping, persisting the assigned unique index value in the definition in association therewith; and responsive to a subsequent request to display ones of the objects on the user interface, using the assigned index values associated with the ones of the objects to group the ones of the objects for the display, comprising grouping the ones of the objects having an identical assigned index value into corresponding related object groupings and displaying the corresponding related object groupings on the user interface in an order according to the assigned index value that is associated with the objects in each of the corresponding related object groupings.

2. The method according to claim 1, wherein the display of a particular one of the corresponding related object groupings further comprises a representation of each of the objects in the particular corresponding related object grouping.

3. The method according to claim 1, wherein the order is a sequential order.

4. The method according to claim 1, further comprising sorting the objects prior to the processing of the plurality of objects.

5. The method according to claim 1, wherein the definition is encoded in a markup language document.

6. The method according to claim 5, wherein:

the markup language document contains a node element for each of the nodes and a link element for each of the links;

the node element for each of the nodes specifies a globally-unique identifier of the node;

the link element for each of the links specifies an identifier of the node, the identifier of the node created by concatenating the globally-unique identifier of the node which is the called node for the link to the globally-unique identifier of the node which is the calling node for the link;

the node element for each of the nodes contains a specification of the assigned unique index value for the node; and the link element for each of the links contains a specification of the assigned unique index value for the link.

7. A system for displaying related objects on a user interface, comprising:

a computer comprising a processor; and instructions which execute, using the processor, to implement functions comprising:

processing a plurality of objects observed to have participated in at least one message flow, the objects comprising nodes and links, to determine each of a plurality of related object groupings, comprising:

selecting an unprocessed one of the nodes for processing;

assigning a unique index value to the selected node;

iterating through the links to locate each link where the selected node is either a calling node or a called node in a message flow;

assigning the unique index value to each of the located links;

for each of the located links, finding a corresponding called node for the link when the selected node is the calling node for the link or finding a corresponding calling node for the link when the selected node is the called node for the link;

assigning the unique index value to each of the found corresponding called nodes and to each of the found corresponding calling nodes; and recursively processing, as the selected unprocessed one of the nodes for processing, each of the found corresponding called nodes and each of the found corresponding calling nodes;

for each of the determined related object groupings, persisting a definition of the related object grouping to persistent storage, the definition identifying each of the nodes and each of the links in the grouping, and for each of the nodes and each of the links in the grouping, persisting the assigned unique index value in the definition in association therewith; and responsive to a subsequent request to display ones of the objects on the user interface, using the assigned index values associated with the ones of the objects to group the ones of the objects for the display, comprising grouping the ones of the objects having an identical assigned index value into corresponding related object groupings and displaying the corresponding related object groupings on the user interface in an order according to the assigned index value that is associated with the objects in each of the corresponding related object groupings.

8. The system according to claim 7, wherein the display of a particular one of the corresponding related object groupings further comprises a representation of each of the objects in the particular corresponding related object grouping.

9. The system according to claim 7, wherein the order is a sequential order.

10. A computer program product for displaying related objects on a user interface, wherein the computer program product is embodied on one or more non-transitory computer-readable media and comprises computer-readable instructions for:

processing a plurality of objects observed to have participated in at least one message flow, the objects comprising nodes and links, to determine each of a plurality of related object groupings, comprising:

selecting an unprocessed one of the nodes for processing;

assigning a unique index value to the selected node;

iterating through the links to locate each link where the selected node is either a calling node or a called node in a message flow;

assigning the unique index value to each of the located links;

for each of the located links, finding a corresponding called node for the link when the selected node is the calling node for the link or finding a corresponding calling node for the link when the selected node is the called node for the link;

assigning the unique index value to each of the found corresponding called nodes and to each of the found corresponding calling nodes; and recursively processing, as the selected unprocessed one of the nodes for processing, each of the found corresponding called nodes and each of the found corresponding calling nodes;

for each of the determined related object groupings, persisting a definition of the related object grouping to persistent storage, the definition identifying each of the nodes and each of the links in the grouping, and for each of the nodes and each of the links in the grouping, persisting the assigned unique index value in the definition in association therewith; and responsive to a subsequent request to display ones of the objects on the user interface, using the assigned index values associated with the ones of the objects to group the ones of the objects for the display, comprising grouping the ones of the objects having an identical assigned index value into corresponding related object groupings and displaying the corresponding related object groupings on the user interface in an order according to the assigned index value that is associated with the objects in each of the corresponding related object groupings.

11. The computer program product according to claim 10, wherein the display of a particular one of the corresponding related object groupings further comprises a representation of each of the objects in the particular corresponding related object grouping.

12. The computer program product according to claim 10, wherein the order is a sequential order.

13. The computer program product according to claim 10, further comprising computer-readable program code for sorting the objects prior to the processing of the plurality of objects.

* * * * *